UNITED STATES PATENT OFFICE.

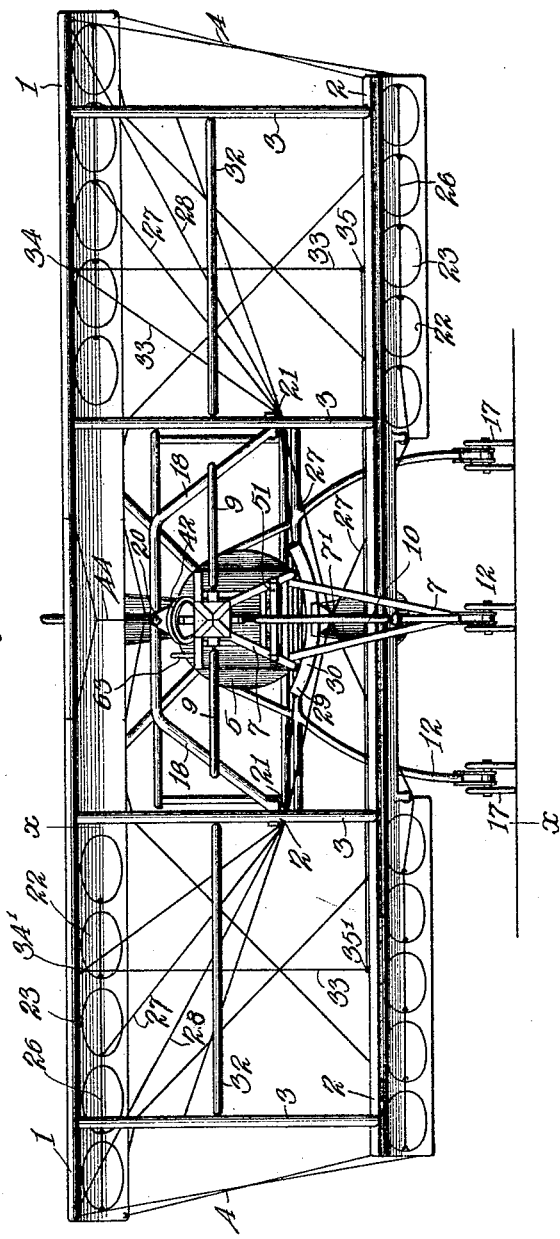

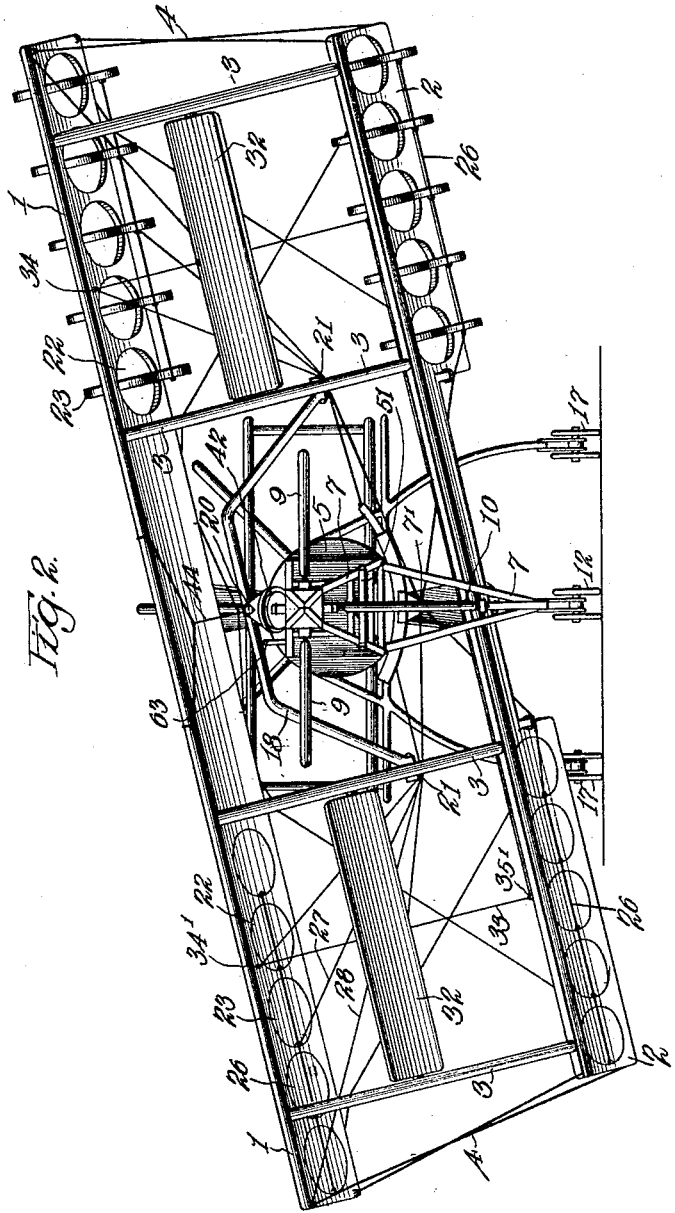

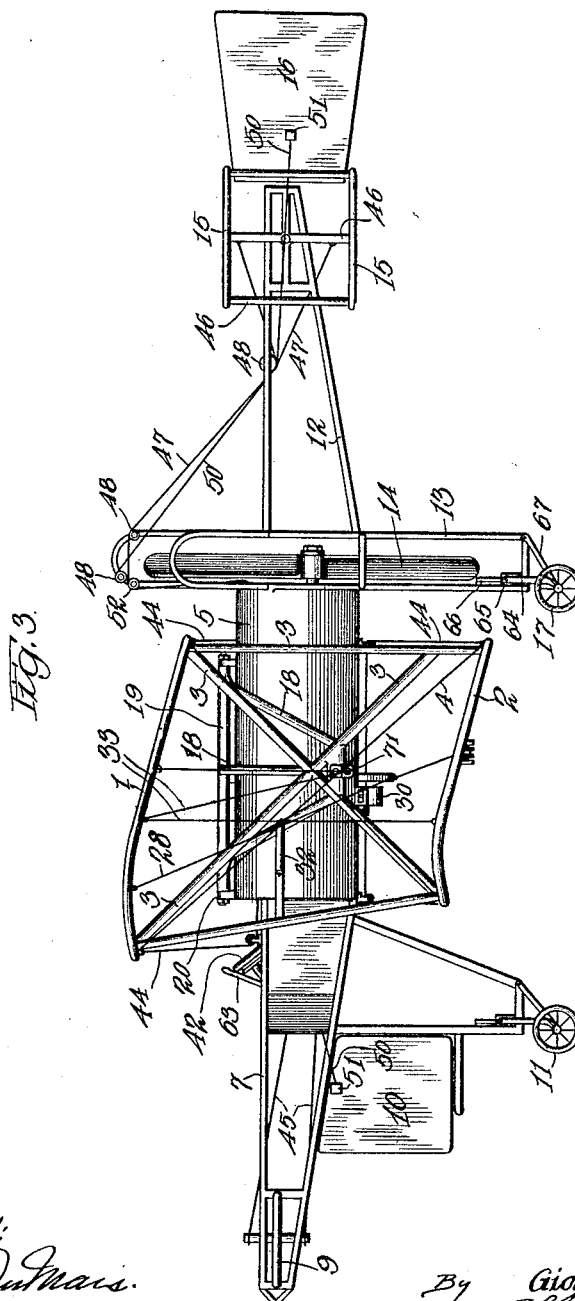

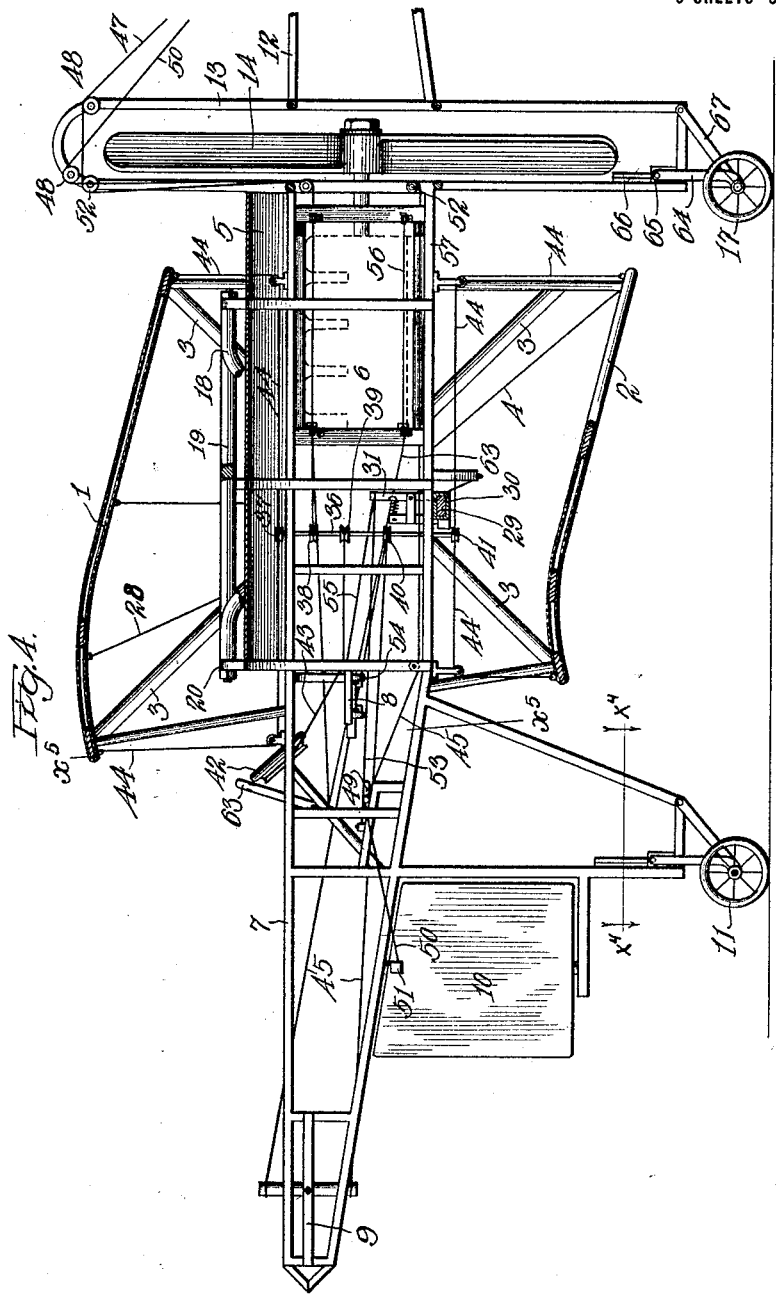

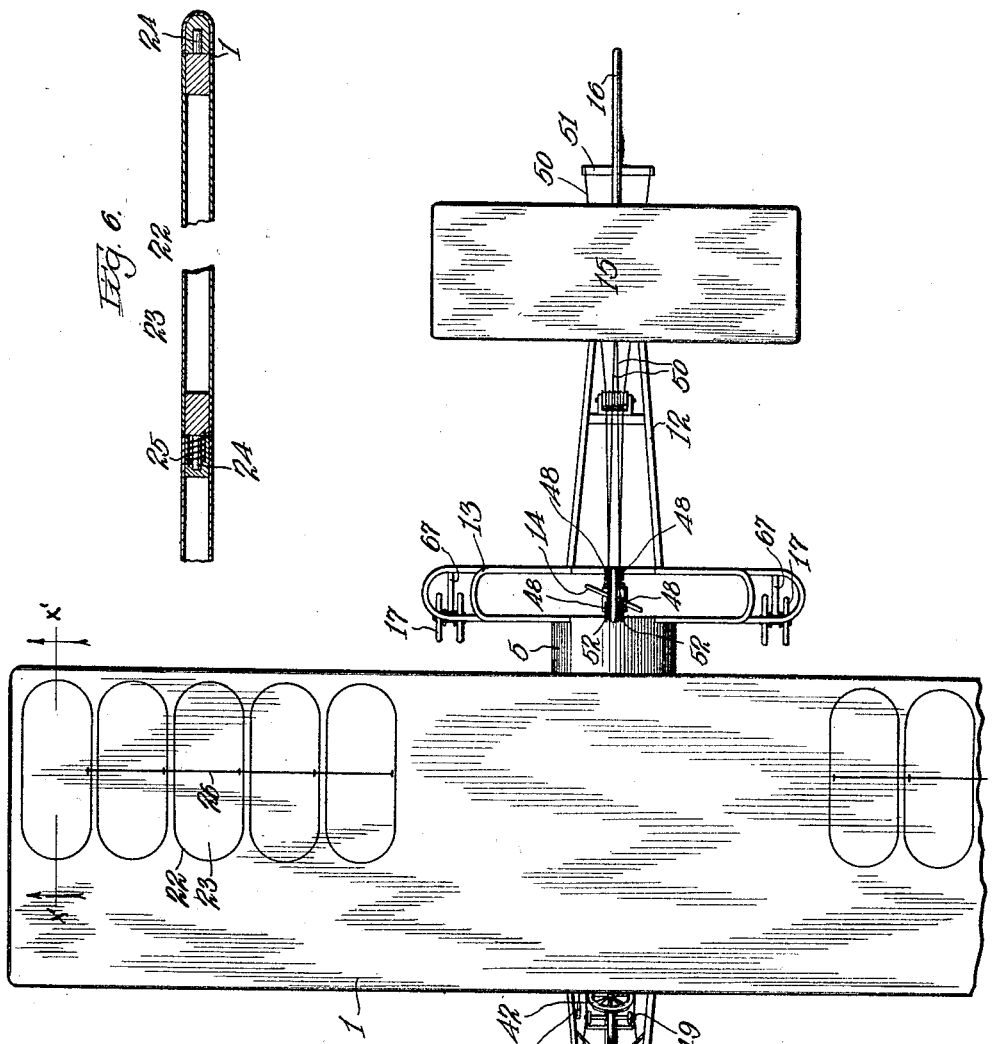

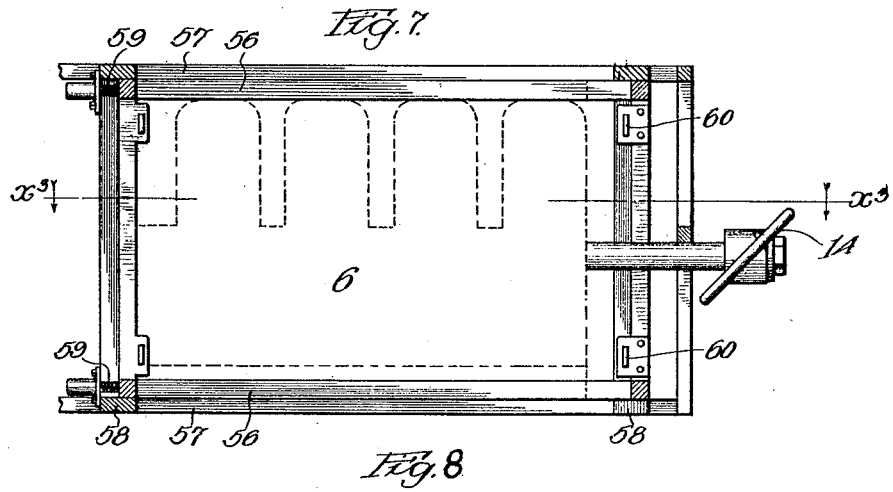
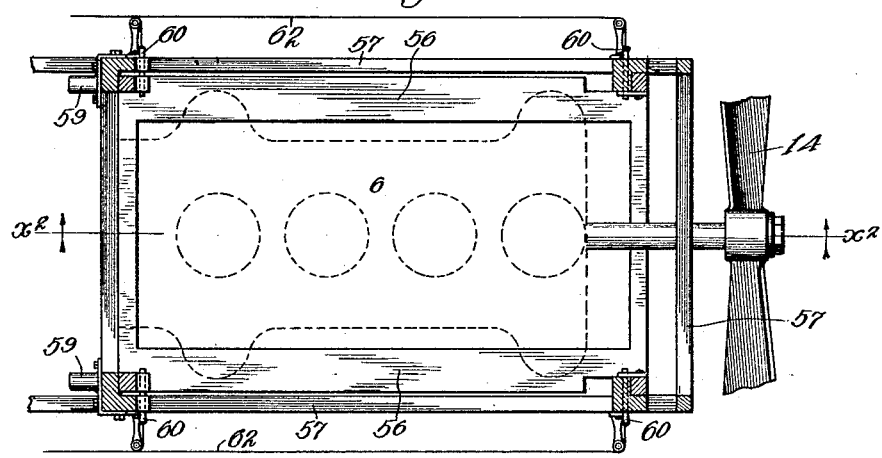
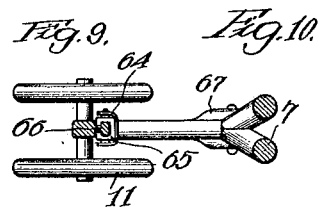
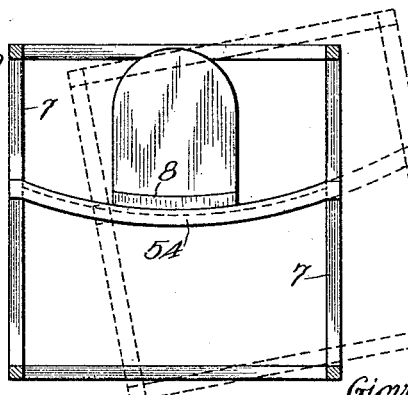

GIOVANNI GRANDINI, OF CHICAGO, ILLINOIS.

FLYING-MACHINE.

1,139,860.     Specification of Letters Patent.     Patented May 18, 1915.

Application filed October 8, 1914. Serial No. 865,613.

*To all whom it may concern:*

Be it known that I, GIOVANNI GRANDINI, a subject of the King of Italy, and a resident of Chicago, in the county of Cook and State of Illinois, have invented certain new and useful Improvements in Flying-Machines, of which the following is a specification.

This invention relates to flying machines of the heavier than air class and of the biplane or monoplane type of the same, and has for its object to provide a simple and efficient structural formation and association of parts whereby the lateral stability of the machine is automatically maintained under ordinary varying conditions met with in actual use.

Another object is to provide a simple and efficient combination and arrangement of parts whereby the longitudinal stability of the machine is effectively controlled by the operator and with which the steering of the machine in either direction is effectively attained.

Another object is to provide a simple and effective construction of parts whereby the driving engine or motor and its main accessories, are, in case of accident, released from the main portion of the machine, to independently fall to the ground, leaving the machine itself and the operator to volplane or otherwise reach safety.

Other and minor objects will appear in detail in the specification and embraced in the claims.

In the accompanying drawings:—Figure 1, is a front elevation of a biplane flying machine, embodying the present improvements, the parts being shown in their normal position and relation. Fig. 2, is a similar view, the parts being shown out of their normal relation, and with the equilibrium restoring means in position for restoring the machine to normal position. Fig. 3, is a side elevation. Fig. 4, is an enlarged detail longitudinal section on line $x$—$x$, Fig. 1, of the forward position of the machine. Fig. 5, is a top plan of the same. Fig. 6, is a detail section on line $x^1$—$x^1$, Fig. 5, illustrating the pivotal connections of the equilibrium restoring vanes of the main planes of the machine. Fig. 7, is a detailed longitudinal section on line $x^2$—$x^2$, Fig. 8, illustrating the detachable supporting means in the main body of the machine for the motor engine and its attached accessories. Fig. 8, is a horizontal section, on line $x^3$—$x^3$, Fig. 7. Fig. 9, is a detail horizontal section on line $x^4$—$x^4$, Fig. 4, illustrating the ground wheel connection of the present construction. Fig. 10, is a detail transverse sectional elevation on line $x^5$—$x^5$, Fig. 4, illustrating the laterally sliding seat for the operator of the present construction.

Similar reference numerals indicate like parts in the several views.

Referring to the drawings, 1 and 2, represents the main planes of a flying machine of the biplane type, of any usual and suitable construction, and disposed one above the other and held in spaced relation by the series of longitudinal trusses or braces 3, and diagonal tension ties or cables 4, as shown.

5 designates the main car or casing of the flying machine, in which is supported, preferably in the detachable manner hereinafter described, the driving motor or engine 6 of the flying machine.

7 designates an outrigging or skeleton frame extending forwardly from the main car or casing 5, and providing means for supporting the seat 8 for the operator, the forward horizontal elevating rudder 9, and the forward vertical steering rudder 10, hereinafter described in detail, as well as the forward runner or groundwheel 11 of the flying machine.

12, designates a companion outrigging or skeleton frame extending rearwardly from the main car or casing 5, and connected to said car or casing 5 by an expanded skeleton frame or housing 13, in which is disposed the bladed propeller 14 of the flying machine, and which propeller has the usual operative connection with the driving motor or engine 6, above referred to. The outrigging or frame 12, provides a means of support for the rear pair of horizontal elevating rudder 15, and for the rear vertical steering rudder 16, hereinafter described in detail, as well as for the pair of rear runners or ground wheels 17 of the flying machine.

18 designates an arch or saddle shaped intermediate skeleton frame or member, which in the present improvement forms a pivotal connection between the main plains 1, 2 and the main car or casing 5, of the flying machine, to permit of independent longitudinal and transverse pivotal movements between said parts. And to such end, said intermediate member 18 has at its top or crest a central longitudinal pivot rail 19, the ends of which are pivotally engaged by pivot ears 20, on the upper portion of the car or casing 5 to provide a swinging movement, in a transverse or lateral plane, between the car or casing 5 and the intermediate member 18. Near the lower extremities of its depending side portions, said intermediate member 18 has transverse pivotal connections 21, with the adjacent inner pair of longitudinal trusses 3, above described, to provide a swinging or pivotal movement in a longitudinal plane, between said intermediate member 18 and the main planes 1, 2, of the flying machine.

In the present improvement the respective upper and lower main planes 1 and 2, are formed with a series of vent openings 22, adjacent to their respective outer ends, and adjacent to their rearward edges, as shown in Figs. 1, 2 and 5.

23 designates a series of longitudinally extending valves or vanes, normally closing the aforesaid series of vent openings 22, and pivoted centrally therein by longitudinal hinge pins 24. In the preferred form of the hinge connections illustrated in Fig. 6, a hinge pin 24 of a valve or vane 23, has an associated coiled spring 25, the tendency of which is to yieldingly maintain its valve or vane 23 in a closed condition. In the preferred arrangement shown in Figs. 1, 2 and 5, there are two groups of valves or vanes 23, to each side of the flying machine, and the valves or vanes 23 of each group are connected together to open and close in unison, by a connecting cable 26, common to the different valves of the group.

27 designates a plurality of flexible connections or cables attached at one end to the aforesaid connecting cable 26, or directly to individual valves 23 of the series of groups of valves above described. Said flexible connections or cables 27 extend transversely and obliquely of the flying machine, and are connected to the forward outrigging 7 of the main car or casing 5, at a fixed point of attachment 7' disposed a distance below the longitudinal pivot connections between the car 5 and intermediate member 18, above described. With the described construction, as the main planes 1 and 2, tilt in a lateral plane in actual use, the valves 23 in the rising portions of the planes are automatically opened to a lesser or greater extent and corresponding with the degree of tilt of the main planes 1, 2, in relation to the car 5. The opening of said valves effects a corresponding reduction in the effective superficial areas of the rising portions of the planes, and as a resulting effect sets up in such portions of the planes, a tendency to return to the normal position, in that the valves or vanes 23 in the descending portions of the main planes, remain closed to maintain the effective superficial area of such downwardly tending portions of the main planes. With the described construction and operation the lateral stability of the flying machine is effectively maintained under all ordinary conditions met with in actual use.

28 designates a plurality of flexible bracing constructions or cables, fixedly attached to the outer extremity of the upper main plane 1, and extending obliquely and in a transverse plane to the median line of the flying machine, and attached to the respective ends of a segmental sliding member 29, having sliding movement in a fixed segmental slideway 30, disposed in adjacent relation to the point of fixed attachment 7' of the flexible connections 27, above described, and as illustrated in Figs. 1 and 2. The above described construction is adapted to strengthen or brace the main planes in their normal transverse pivotal movement with relation to the main car or casing 1, and materially aids in providing a stable connection between the parts.

31 designates a latching lever on the fixed slideway 30 aforesaid, and having locking engagement with the aforesaid sliding member 29. Said latching lever 31 is controlled by the operative connections of an automatic and a manually actuated nature, hereinafter described in detail.

32 designates a pair of horizontal elevating rudders disposed in the space between the upper and lower main planes 1 and 2, and in the forward and outer portions of said space and preferably with their points of pivotal support in the series of trusses 3 of the planes aforesaid.

33 designates a flexible connection or cable, the respective terminal ends of which are attached to the fixed point of attachment 7' of the forward outrigging 7, before described. From said point of attachment the flexible connection 33 extends to a guide sheave or pulley 34 on the upper main plane 1, around said sheave and down to a guide sheave or pulley 35 on the lower main plane 2, being attached intermediate of said guide sheaves to the rear edge of the horizontal elevating rudder 32, to the right. From the sheave 35 aforesaid, the flexible connection 33 extends transversely to a guide sheave or pulley 35' on the lower main plane 2, and from thence to a guide sheave or pulley 34' on the upper main plane 1, being attached intermediate of said sheaves to the rear edge of the horizontal elevating rudder 32, to the left. From the sheave 34' the flexible connection 33 extends to the fixed point of attachment 7', as aforesaid. With the described construction and connection of parts, as the main planes 1 and 2, tilt in a lateral plane in actual use, the horizontal rudders 32 are automatically actuated in opposite directions, to aid in restoring the lateral stability of the machine, and in this connection operating in unison with the valves or vanes 23, above described.

36 designates a vertical shaft journaled in the main car or casing 5, and carrying a series of sheaves or pulleys 37, 38, 39, 40 and 41, arranged in separated relation, and having individual flexible or cable connections with the various operating portions of the flying machine, now to be described in connection with the detail construction of such operating portions or parts.

42 designates a steering wheel journaled in the main car or casing 5, in adjacent relation to the operator's seat 8, and capable on convenient operation by the operator.

43 designates a flexible connection or cable forming an operative connection between the aforesaid steering wheel 42, and the vertical shaft 36 above described, and the series of sheaves or pulleys, and connections associated with said shaft.

44 designates flexible connections or cables forming operative connections between the sheaves or pulleys 37, 41, of the aforesaid shaft 36, and the main planes 1 and 2, to affect a longitudinal tilting adjustment of said planes 1, 2, in unison with the tilting adjustment of the forward and rearward horizontal elevating rudders 9 and 15, hereinafter described in detail. And to such end the aforesaid flexible connections 44, extend longitudinally from the sheaves 37, 41, to and around guide sheaves on the car 5 and outrigging 7, and thence vertically for attachment to the front and rear edges of the main planes 1 and 2, as illustrated more particularly in Fig. 4.

The forward horizontal elevating rudder 9, above referred to, is pivotally supported in the forward outrigging 7, of the machine, and is operated and controlled by the following means:—45 designates a flexible connection or cable forming an operative connection between a sheave or pulley 40, on the vertical shaft 36, and the lateral operating arm of the aforesaid forward horizontal elevating rudder 9.

The rearward horizontal elevating rudders 15 are two in number, connected together in separated relation by an intermediate skeleton connecting frame 46, which in turn is pivotally mounted in the rearward outrigging 12 of the machine, and said rudders 15 are operated and controlled by the following means:—47 designates a flexible connection or cable extending from the intermediate frame 46 of the rudders 15, forwardly to and around a series of guide sheaves 48, carried on the outrigging 12 and on the skeleton inclosing frame 13 of the bladed propeller 14 of the machine. From the last of said guide sheaves, the flexible connection 47 extends to the sheaves or pulley 38 of the vertical shaft 36, to operate in unison therewith.

The forward vertical steering rudder 10, is pivotally supported in the forward outrigging 7, before described, and is operated and controlled by the following means:— 49 designates a foot lever pivoted in the main car or casing 5, in adjacent relation to the operator's seat 8, before referred to and adapted for operation by the feet of the operator.

50 designates a pair of flexible connections extending from the foot lever 49, to the side arms 51 of the forward vertical steering rudder 10, above described, and adapted to operatively connect said rubber with the foot lever 49.

The rearward vertical steering rudder 16, is pivotally supported in this intermediate carrying frame 46 of the horizontal elevating rudders 15, described above in detail, and said rudder 16 is operatively attached to the above described operating connections of the forward vertical steering rudder 10, by continuations of the flexible connection 50 aforesaid, which extend rearwardly through the main car 5, to and around a series of guide sheaves 52, carried on the skeleton inclosing frame 13 of the bladed propeller 14 and on the rearward outrigging 12, and from the last of said guide sheaves, to the lateral operating arms of said rearward vertical steering rudder 16, to attain an operation of the same in unison with that of the forward vertical steering rudder 10, above described.

53, is a flexible connection or cable operatively connected to the foot lever 49, and to the latching lever 31, heretofore described, and adapted to enable the operator to release said latching lever from its engagement with the sliding member 29 of the main planes 1 and 2, when desired.

The operator's seat 8, before referred to, is movably mounted on a transversely arranged support 54, carried on the forward outrigging 7, and is adapted to maintain by gravity and the weight of the operator, a central position regardless of lateral tilting of the main car or casing 5, in one direction or the other.

55 designates a flexible connection or cable operatively connected to the operator's seat 8, aforesaid, and to the latching lever 31, heretofore described, and adapted to automatically release said lever 31, from its engagement with the sliding member 29 aforesaid, when an undue lateral tilting of the flying machine takes place.

In the present improvement the supporting frame 56 of the driving engine or motor 6 of the flying machine, is disposed within an open bottom compartment, formed by a skeleton frame 57, secured within the main car or casing 5, with the aforesaid frame 56 of the motor normally resting upon and supported by transverse end ledges 58, on the skeleton frame 57, as illustrated in Figs. 7 and 8.

59 designates springs tending to force the motor frame 56, aforesaid, in a rearward direction and off from its support upon the aforesaid ledges 58, and so that the motor 6 with its propeller 14 and other attached accessories, may at the will of the operator, be released and permitted to fall away from the other portion of the flying machine, when safety indicates such a proceedings. In connection with this construction, the skeleton inclosing frame 13, of the bladed propeller 14, will be formed with an open bottom to admit of the escape of said propeller.

60 designates latch bolts guided in the skeleton frame 57, aforesaid, and engaging the supporting frame 56 of the motor 6, to hold the same in their normal position against the tension of the springs 58, aforesaid.

62 designates flexible connections or cables operatively connected to the latch bolts 60, aforesaid, and extending forwardly to an operating lever 63, pivoted on the forward outrigging 7 of the main car 5, within convenient reach of the operator and so that he can when desired operate said lever to release the motor 6 and its attached accessories, and permit the same to fall independent of the other portions of the flying machine.

The ground wheels 11 and 17, before referred to, are carried by vertical links 64, which in turn are connected to sliding heads 65 adapted to slide upon vertical guideways 66, at the lower end of depending extensions of the forward and rearward outrigging 7 and 12, before described, and such movement of the sliding heads 65 is retarded by any usual means, such as frictional resistance or a series of cushion springs.

67 designates radius links pivotally connected to the outrigging 7 aforesaid, and to the lower ends of the links 64, and adapted to impose an oblique movement on the ground wheels, as they move toward the main portions of the machine, as the same makes a ground landing.

While the present improvements are shown in the drawings as applied to a biplane flying machine, the scope of the present invention is intended to embrace the use of the various novel structures in a monoplane or other usual type of flying machines.

Having thus fully described my said invention which I claim as new and desire to secure by Letters Patent, is:—

1. A flying machine comprising a main transverse plane, a car provided with elevating and steering rudders, an intermediate frame of a skeleton arch form connected at its crown to the car by a longitudinal pivot and at its depending side portions to the main plane by transverse pivots, and a transverse bracing connection attached to the respective ends of the main plane and having a sliding bearing at the underside of the car, substantially as set forth.

2. A flying machine comprising a main transverse plane, a car provided with elevating and steering rudders, an intermediate frame of a skeleton arch form connected at its crown to the car by a longitudinal pivot and at its depending side portions to the main plane by transverse pivots, a transverse bracing connection attached to the respective ends of the main plane and having a sliding portion moving in a guideway on the underside of the car, and means on the car for latching said sliding portion against movement, substantially as set forth.

3. A flying machine comprising a main transverse plane, a car provided with elevating and steering rudders, an intermediate frame connected to the car by a longitudinal pivot and to the main plane by transverse pivots, a transverse bracing connection attached to the respective ends of the main plane and having a sliding portion moving in a guideway on the underside of the car, and means on the car for latching said sliding portion against movement, the same comprising a latching lever engaging said sliding portion and an operating lever disposed adjacent to the operator's seat and operatively connected to said latching lever, substantially as set forth.

4. A flying machine comprising a main transverse plane, a car provided with elevating and steering rudders, an intermediate frame connected to the car by a longitudinal pivot and to the main plane by transverse pivots, a transverse bracing connection attached to the respective ends of the main plane and having a sliding portion moving in a guideway on the underside of the car, and means on the car for latching said sliding portion against movement, the same comprising a latching lever engaging said sliding portion and a laterally shifting seat having operative connection with said latching lever, substantially as set forth.

5. A flying machine comprising a main transverse plane, a car provided with elevating and steering rudders, an intermediate frame connected to the car by a longitudinal pivot and to the main frame by transverse pivots, a transverse bracing connection attached to the respective ends of the main plane and having a sliding portion moving in a guideway on the underside of the car, and means on the car for latching said sliding portion against movement, the same comprising a latching lever engaging said sliding portion, an operating lever disposed adjacent to the operator's seat and operatively connected to said latching lever and a laterally shifting operator's seat having operative connections with said latching lever, substantially as set forth.

6. A flying machine comprising a main transverse plane formed with vent openings adjacent to its respective ends, hinged valves or vanes controlling said openings, springs associated with said valves or vanes to yieldingly hold the same closed, a car provided with elevating and steering rudders, an intermediate frame connected to the car by a longitudinal pivot and to the main plane by transverse pivots, and operative connections extending from the valves aforesaid to the underside of the car and attached thereto, substantially as set forth.

7. A flying machine comprising a main transverse plane formed with a series of vent openings adjacent to each of its respective ends, hinged valves controlling said openings and connected together to operate in unison, springs associated with said valves to yieldingly hold the same closed, a car provided with elevating and steering rudders, an intermediate frame connected to the car by a longitudinal pivot and to the main plane by transverse pivots, and operative connections extending from the valves aforesaid to the underside of the car and attached thereto, substantially as set forth.

8. A flying machine comprising upper and lower main planes formed with vent openings adjacent to their respective ends, hinged valves or vanes controlling said openings, a car provided with elevating and steering rudders, an intermediate frame connected to the car by a longitudinal pivot and to the main planes by transverse pivots, and operative connections extending from the valves aforesaid to the underside of the car and attached thereto, substantially as set forth.

9. A flying machine comprising upper and lower main planes formed with vent openings adjacent to their respective ends, hinged valves controlling said openings, springs associated with said valves to yieldingly hold the same closed, a car provided with elevating and steering rudders, an intermediate frame connected to the car by a longitudinal pivot and to the main planes by transverse pivots, and operative connections extending from the valves aforesaid to the underside of the car and attached thereto, substantially as set forth.

10. A flying machine comprising upper and lower main planes formed with a series of vent openings adjacent to each of their respective ends, hinged valves controlling said openings and connected together to operate in unison, a car provided with elevating and steering rudders, an intermediate frame connected to the car by a longitudinal pivot and to the main planes by transverse pivots, and operative connections extending from the valves aforesaid to the underside of the car and attached thereto, substantially as set forth.

11. A flying machine comprising upper and lower main planes formed with a series of vent openings adjacent to each of their respective ends, hinged valves controlling said openings and connected together to operate in unison, springs associated with said valves to yieldingly hold the same closed, a car provided with elevating and steering rudders, an intermediate frame connected to the car by a longitudinal pivot and to the main planes by transverse pivots, and operative connections extending from the valves aforesaid to the underside of the car and attached thereto, substantially as set forth.

12. A flying machine comprising a main transverse plane, a pair of horizontal elevating rudders journaled beneath the respective sides of said plane, a car provided with elevating and steering rudders, an intermediate frame of a skeleton arch form connected at its crown to the car by a longitudinal pivot and at its depending side portions to the main plane by transverse pivots, and flexible operative connections extending from said horizontal elevating rudders to the underside of the car and attached thereto, substantially as set forth.

13. A flying machine comprising a main transverse plane, a car provided with elevating and steering rudders, an intermediate frame connected to the car by a longitudinal pivot and to the main plane by transverse pivots, a vertical shaft journaled in the car, a flexible connection operatively attached to said shaft and extending to and attached to the respective front and rear ends of the main plane, a hand wheel located adjacent to the operator's seat, and having operative connections with the vertical shaft aforesaid, substantially as set forth.

14. A flying machine comprising a main transverse plane, a car having forward and rearward outriggings, the rear outrigging being connected to the car by an expanded skeleton frame, a propeller arranged within said skeleton frame, a motor mounted in the car and carrying said propeller, horizontal elevating rudders pivoted on the aforesaid outrigging, a vertical shaft journaled in the car, flexible connections operatively connected to said shaft and extending to and attached to said rudders, and a hand wheel located adjacent to the operator's seat and having operative connection with the vertical shaft aforesaid, substantially as set forth.

15. A flying machine comprising a main transverse plane, a car having forward and rearward outriggings, the rear outrigging being connected to the car by an expanded skeleton frame, a propeller arranged within said skeleton frame, a motor mounted in the car and carrying said propeller, a horizontal elevating rudder pivoted on the forward outrigging, a pair of connected horizontal elevating rudders pivoted on the rearward outrigging, a vertical shaft journaled in the car, flexible connections operatively connected to said shaft and extending to and attached to said rudders, and a hand wheel located adjacent to the operator's seat and having operative connection with the vertical shaft aforesaid, substantially as set forth.

16. A flying machine comprising a main transverse plane, a car having forward and rearward outriggings, the rear outrigging being connected to the car by an expanded skeleton frame open at its bottom, a propeller arranged within said skeleton frame, a motor mounted in the car and carrying said propeller, vertical steering rudders pivoted on the aforesaid outriggings, a foot lever fulcrumed in the car, and flexible connections between said lever and the rudders, the flexible connections between the foot lever and rear rudder extending over the aforesaid expanded skeleton frame, substantially as set forth.

17. A flying machine comprising a main transverse plane, a car having forward and rearward outriggings, the rear outrigging being connected to the car by an expanded skeleton frame, a propeller arranged within said skeleton frame, a motor mounted in the car and carrying said propeller, horizontal elevating rudders pivoted on the aforesaid outriggings, a vertical shaft journaled in the car, flexible connections operatively connected to said shaft and extending to and attached to said rudders, a hand wheel located adjacent to the operator's seat and having operative connections with said vertical shaft, vertical rudders pivoted on the aforesaid outriggings, a foot lever fulcrumed in the car, flexible connections operatively connected to said foot lever and extending to and operatively connected to said vertical rudders, substantially as set forth.

18. A flying machine comprising a main transverse plane, a car having forward and rearward outriggings, the rear outrigging being connected to the car by an expanded skeleton frame, a propeller arranged within said skeleton frame, a motor mounted in the car and carrying said propeller, a horizontal elevating rudder pivoted on the forward outrigging, a pair of connected horizontal elevating rudders pivoted on the rearward outrigging, a vertical shaft journaled in the car, flexible connections operatively connected to said shaft and extending to and attached to said rudders, a hand wheel located adjacent to the operator's seat and having operative connections with said vertical shaft, vertical rudders pivoted on the aforesaid outriggings, a foot lever fulcrumed in the car, flexible connections operatively connected to said foot lever and extending to and operatively connected to said vertical rudders, substantially as set forth.

19. A flying machine comprising a main transverse plane, a car connected to said plane and provided with elevating and steering rudders, an open bottom supporting frame on said car, a motor having a frame adapted for detachable engagement with said supporting frame and having a longitudinally extending power shaft, a bladed propeller mounted directly on said shaft, means for locking the two frames in engaged relation, and means for releasing said locking means, substantially as set forth.

20. A flying machine comprising a main transverse plane, a car having forward and rearward outriggings, the rear outrigging being connected to the car by an expanded skeleton frame, a propeller arranged within said skeleton frame, an open bottom supporting frame on said car, a motor having a frame adapted for detachable engagement with said supporting frame, means for locking the two frames in engaged relation, and means for releasing said locking means, substantially as set forth.

21. A flying machine comprising a main transverse plane, a car having forward and rearward outriggings, the rear outrigging being connected to the car by an expanded skeleton frame, a propeller arranged within said skeleton frame, an open bottom supporting frame on said car, a motor having a frame adapted for detachable engagement with lateral ledges on said supporting frame, springs tending to move said motor frame from engagement with said ledges, latching bolts adapted to hold the motor frame in place on said ledges, and operative connections for said bolts extending to an operating means located in reach of the operator, substantially as set forth.

Signed at Chicago, Illinois, this 19th day of September, 1914.

GIOVANNI GRANDINI.

Witnesses:
 ALFREDO GRANDINI,
 MORRIS MILLER.

Copies of this patent may be obtained for five cents each, by addressing the "Commissioner of Patents, Washington, D. C."